Feb. 13, 1973
A. R. BANCROFT
3,716,623
EXTRACTION OF DEUTERIUM FROM HYDROGEN GAS
USING AMINES IN A BITHERMAL PROCESS
Filed April 3, 1970
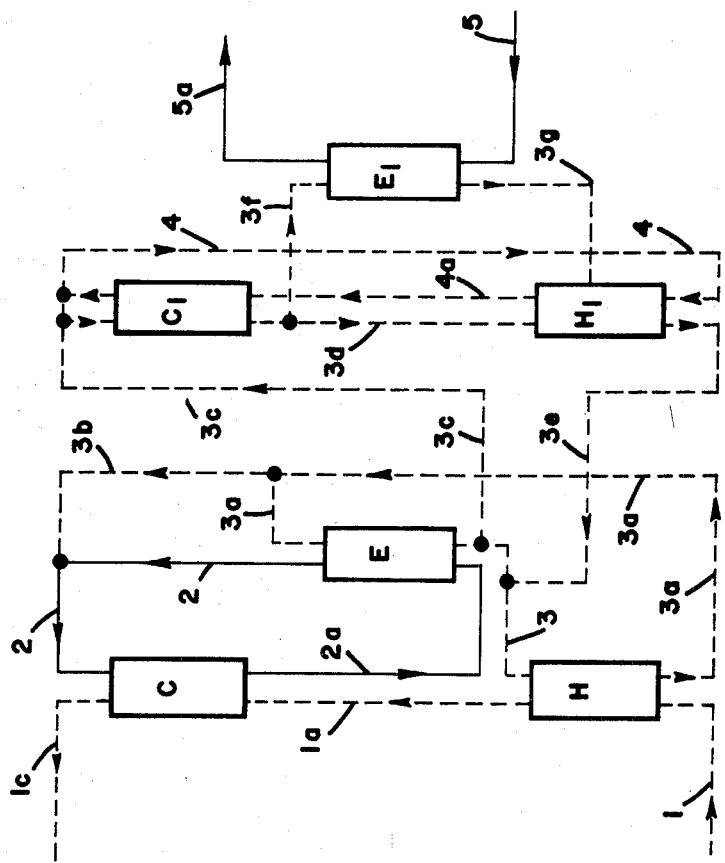

United States Patent Office 3,716,623
Patented Feb. 13, 1973

3,716,623
EXTRACTION OF DEUTERIUM FROM HYDROGEN GAS USING AMINES IN A BITHERMAL PROCESS
Allan R. Bancroft, Deep River, Ontario, Canada, assignor to Atomic Energy of Canada Limited, Ottawa, Ontario, Canada
Filed Apr. 3, 1970, Ser. No. 25,317
Claims priority, application Canada, Apr. 8, 1969, 47,993/69
Int. Cl. C01c 1/00, 87/127; C01b 1/00
U.S. Cl. 423—248      12 Claims

ABSTRACT OF THE DISCLOSURE

In the extraction of deuterium from hydrogen in a bithermal process for the production of heavy water, a stream containing a first liquid amine with up to five carbon atoms per molecule is used as the exchange liquid in one of the exchange regions, and stream containing a second liquid amine with up to five carbon atoms per molecule or ammonia is used as the exchange liquid in the other exchange region, and deuterium exchange between the two exchange liquid streams is caused to occur under conditions such that countercurrent contact is possible, for example such that one of the exchange liquid exists substantially as a vapour and a portion of the first or second exchange liquid enriched in deuterium is separated after exchange between the two liquids. The amine may be primary aliphatic monoamine or diamines.

---

The invention relates to the extraction of deuterium from hydrogen gas in a bithermal process.

In a bithermal process, the hydrogen gas is passed through an exchange liquid at one temperature and is subsequently passed through the exchange liquid at another temperature. The difference between these two temperatures is one of the factors affecting deuterium recovery from the hydrogen gas, the greater the temperature difference the greater the recovery. However, most suitable exchange liquids have properties which are such that the temperature difference cannot be made as great as would otherwise be desired.

According to this invention, a stream containing a first liquid amine with up to five carbon atoms per molecule is used as the exchange liquid in one of the exchange regions, and stream containing a second liquid amine with up to five carbon atoms per molecule or ammonia is used as the exchange liquid in the other exchange region, and deuterium exchange between the two exchange liquid streams is caused to occur under conditions such that countercurrent contact is possible, for example such that one of the exchange liquid exists substantially as a vapour. The amine may be primary aliphatic monoamines or diamines.

Thus, one exchange liquid can be chosen so that its properties are especially suitable for use at the temperature of the hot exchange region, and the other exchange liquid can be chosen so that its properties are especially suitable for use at the temperature of the cold exchange region.

For example, 1,2-diaminopropane may be used in the hot exchange region, and aminomethane in the cold exchange region. Other suitable combinations are ammonia and 1,3-diaminopropane, aminoethane and diaminoethane, and aminoethane and 1,2-diaminopropane.

If desired, either or both exchange liquid streams may be suitable mixtures of amines or of one or more amines and ammonia. For example, one liquid stream may be a mixture of 10% of one liquid in another, and the second liquid stream may be a mixture of 5% of the other liquid in the first liquid. These percentages are by volume.

The process according to the invention is useful for extracting deuterium from ammonia synthesis gas, that is to say a gaseous mixture of nitrogen and hydrogen in the ratio of approximately one to three by volume which has been prepared commercially for subsequent synthesis to ammonia. Other sources of commercial hydrogen or hydrogen-containing gases may also be suitable.

One embodiment of the invention will now be described, by way of example, with reference to the accompanying drawing which shows a flow diagram of a bithermal process.

Referring to the drawing, a stream 1 of ammonia synthesis gas is passed upwardly through a hot tower H and is then passed upwardly as stream 1q through a cold tower C, after which it passes as stream 1c to an ammonia synthesis plant. A stream 2 of second exchange liquid formed by aminomethane containing a catalyt is passed downwardly through the cold tower C and is then passed upwardly as stream 2a through an exchange tower E before being recycled to the cold tower C.

A stream 3 of first exchange liquid formed by 1,2-diaminopropane containing a catalyst is passed downwardly through the hot tower H and then downwardly as stream 3a through the exchange tower E before being recycled to the hot tower H. Before the stream 3a enters the exchange tower E, a portion thereof is fed as stream 3b to the stream 2 of second exchange liquid before it enters the cold tower C. The purpose of the stream 3b will be described later.

The synthesis gas stream 1 gains deuterium from the first exchange liquid stream 3 in the hot tower H, and then loses a greater amount of deuterium to the second exchange liquid stream 2 in the cold tower C. The second exchange liquid stream 2, 2a having been enriched in deuterium in the cold tower C, passes through the exchange tower E and loses deuterium to the first exchange liquid stream 3a. Conditions in the exchange tower E are such that the second exchange liquid stream 2, 2a exists substantially as a vapour therein, with the first exchange liquid stream 3, 3a remaining substantially as a liquid. In this manner, the second exchange liquid stream 2a is caused to pass upwardly through the downwardly moving first liquid stream 3a. However, the substantial vapourisation of the second liquid stream 2a means that some of the catalyst dissolved in the stream 2a is lost to the stream 3a in the exchange tower E. The stream 3b thus returns catalyst to the stream 2, and this means of course that the stream 2, 2a also contains 1,2-diaminopropane.

The first exchange liquid stream 3 is richest in deuterium as it travels from the exchange tower E to the hot tower H, and a stream 3c may be taken from the stream 3 at this point and passed through a second stage deuterium extraction process before being returned to the stream 3. This second stage will be described later.

In one example of the process previously described, the synthesis gas stream 1 entered the hot tower H with concentration of 120 parts of deuterium per million parts of hydrogen as atom ratio, and left the hot tower H as stream 1a with a concentration of 1600 p.p.m. The hot tower H was at 90° C. The synthesis gas stream 1a left the cold tower C with a deuterium concentration of 40 p.p.m., thus giving a deuterium recovery of 67%. The cold tower C was at −90° C.

The exchange liquid stream 2 entered the cold tower C with a deuterium concentration of 400 p.p.m. and left with a concentration of 4800 p.p.m. The exchange liquid stream 3a left the hot tower H with a deuterium concentration of 380 p.p.m., and left the exchange tower E as steam 3 with a concentration of 4500 p.p.m. The exchange tower E was at a temperature of 90° C. and pressure somewhat below the 300 p.s.i. in the rest of the system.

Because the recovery of deuterium from the synthesis gas stream 1 is relatively high, it is not necessary to recycle part of it through the hot and cold towers, although this can be done if desired to improve the recovery.

Aminomethane does have an acceptable exchange ratio at both the hot and cold temperature used in the described process. It freezes at −92.5° C., but it has a relatively high vapour pressure at the hot temperature. Thus if it was used at the hot temperature much of the aminomethane would exist as vapour. In this case, the tower contact stages would be less efficient, more stages and a higher tower would be required, and the tower would have to be of larger diameter to accommodate the vapour travelling with the synthesis gas stream. Additional equipment and considerable energy would thus be required to saturate the synthesis gas with the amine. 1,2-diaminopropane has a lower vapour pressure and is thus more suitable as the hot tower liquid. The mixture of aminomethane and 1,2-diaminopropane flowing through the cold tower C can be arranged to be an eutectic mixture with a consequently much lower freezing point.

The right hand part of the flow diagram shows one second stage process which may be used. The exchange liquid stream 3c is passed downwardly through a cold tower $C_1$, and then downwardly as stream 3d through a hot tower $H_1$, before being returned as stream 3e to the stream 3. In this second stage, hydrogen or synthesis gas is used as an exchange gas, and a stream 4 of hydrogen or synthesis gas is passed upwardly through the hot tower $H_1$ and then upwardly as stream 4a through the cold tower $C_1$, before being recycled to the hot tower $H_1$.

A stream 3f of exchange liquid is withdrawn from the stream 3d as it leaves the cold tower C1, passed downwardly through an exchange tower E1 and then passed as stream 3g into the upper part of the hot tower $H_1$. A stream 5 of ammonia gas obtained from an ammonia distillation system, for example, is passed upwardly through the exchange tower E1, from which it leaves as stream 5a.

In the cold tower $C_1$, deuterium is transferred from the hydrogen or synthesis gas stream 4a to the exchange liquid stream 3c. In the hot tower H1, deuterium is transferred from the exchange liquid stream 3d to the hydrogen or synthesis gas stream 4. Thus, the deuterium concentration in the stream 3f taken from the exchange liquid stream 3d as it leaves the cold tower C1 is relatively high. Some of the deuterium in the exchange liquid stream 3f is transferred to the gaseous ammonia stream 5 in the exchange tower E1.

In an example of this second stage process, the cold tower C1 was at −30° C. and the hot tower $H_1$ was at 90° C. The exchange liquid stream 3c entered the cold tower C1 with a deuterium concentration of 4500 p.p.m., and returned as stream 3e to the stream 3 with a concentration of 4000 p.p.m. The deuterium concentration in the hydrogen stream 4 as it left the cold tower C1 was 1,000 p.p.m. The ammonia stream 5 entered the exchange tower E1 with a deuterium concentration of 75,000 p.p.m. and left as stream 5a with a concentration of 150,000 p.p.m. The enriched ammonia can, for example, then be distilled to required purity.

It would of course be possible to use the two amine system of the first stage also in the second stage and subsequent stages if necessary.

The catalyst may be made by dissolving lithium, sodium, potassium, cesium or rubidium, or an amide thereof, in the exchange liquid.

I claim:

1. A process of extracting deuterium from hydrogen gas including passing said hydrogen gas and a first exchange liquid stream selected from the group consisting of alkyl amines with up to five carbon atoms per molecule and ammonia through a hot region to cause deuterium to be transferred from the first liquid stream to the hydrogen gas, passing said hydrogen gas and a second exchange liquid stream different from said first exchange liquid stream and selected from the group consisting of alkyl amines with up to five carbon atoms per molecule and ammonia through a cold region to cause deuterium to be transferred from the hydrogen gas to the second stream, passing the first and second liquid streams through a third region under conditions which cause said second liquid stream to be in the vapor state and said first stream to be in the liquid state and allow counter-current contacting of the two streams to cause deuterium to be transferred from the second liquid stream to the first liquid stream and separating a portion of said first exchange liquid enriched in deuterium leaving the third region.

2. A process according to claim 1 wherein one of the exchange liquid streams is substantially vaporized in the third region.

3. A process according to claim 2 wherein said liquid streams contain catalyst, and a portion of the first liquid stream is fed into the second liquid stream, which is vaporized in the third region, as it leaves the third region to restore catalyst thereto.

4. A process according to claim 1, wherein the hydrogen gas is a component of ammonia synthesis gas.

5. A process according to claim 1, wherein at least one of the liquid streams is a mixture of at least two liquids selected from the group consisting of alkyl amines with up to five carbon atoms in the molecule and ammonia.

6. A process according to claim 1, in which the amines are primary aliphatic monoamines.

7. A process according to claim 1, in which the amines are primary aliphatic diamines.

8. A process according to claim 1, in which a catalyst is made by dissolving an element selected from the group consisting of lithium, sodium, potassium, cesium and rubidium in the exchange liquid.

9. A process according to claim 1, in which a catalyst is made by dissolving the amide of an element selected from the group of lithium, sodium, potassium, cesium and rubidium in the exchange liquid.

10. A process according to claim 1 wherein a portion of the stream of the first exchange liquid leaving the third region is passed through a second deuterium extraction stage.

11. A process according to claim 10 wherein said second stage includes a bithermal countercurrent exchange with hydrogen.

12. A process according to claim 11 wherein said portion of the exchange liquid stream passes from a cold region to a hot region, and a further portion of said exchange liquid stream leaving the cold region of said second stage is passed through means for further enrichment.

References Cited

UNITED STATES PATENTS 3,457,041   7/1969   Klein et al. _____ 23—211

FOREIGN PATENTS 619,092   4/1961   Canada _____ 23—210 I

OSCAR R. VERTIZ, Primary Examiner

H. S. MILLER, Assistant Examiner

U.S. Cl. X.R.

23—204 C, 210; 260—563 R; 423—648